H. A. KIMBER.
BLOWING TANK FOR COMPRESSED AIR TRANSPORT SYSTEMS.
APPLICATION FILED JAN. 31, 1918.

1,348,010.

Patented July 27, 1920.
4 SHEETS—SHEET 1.

INVENTOR
Harry Arthur Kimber
BY
ATTORNEY

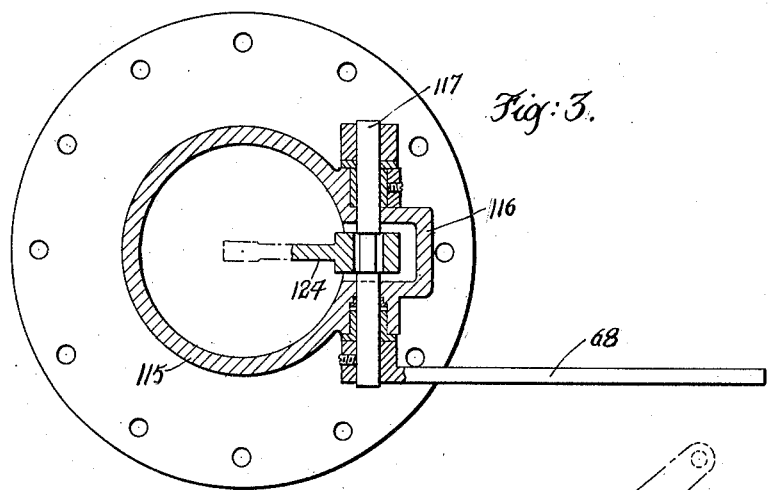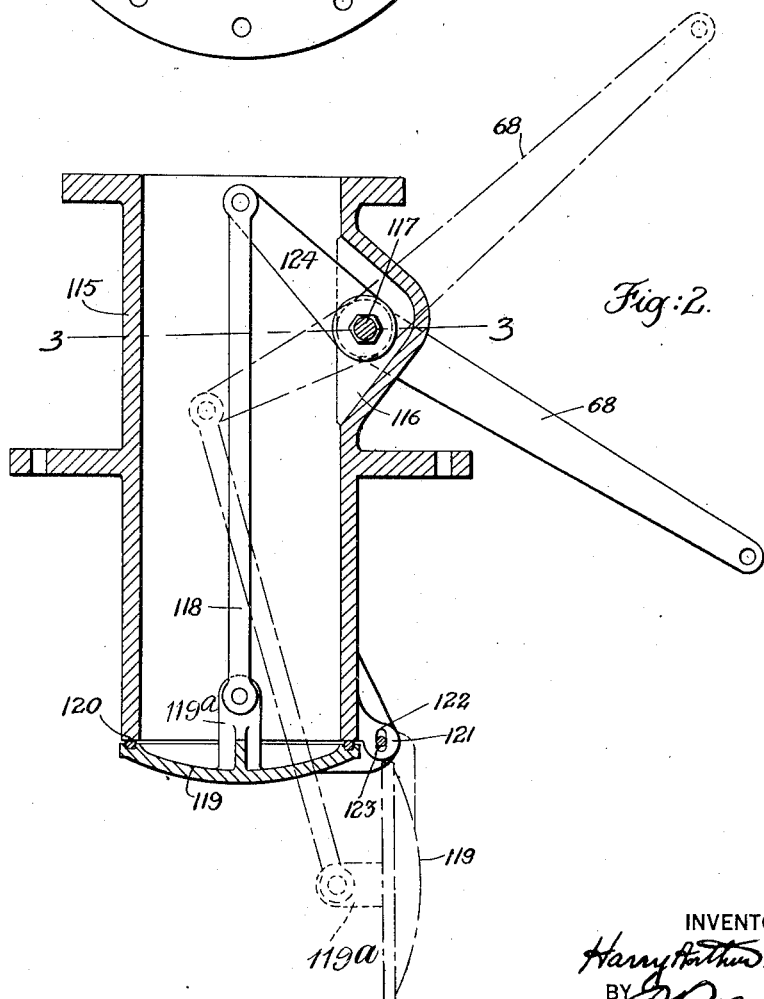

H. A. KIMBER.
BLOWING TANK FOR COMPRESSED AIR TRANSPORT SYSTEMS.
APPLICATION FILED JAN. 31, 1918.

1,348,010.

Patented July 27, 1920.
4 SHEETS—SHEET 3.

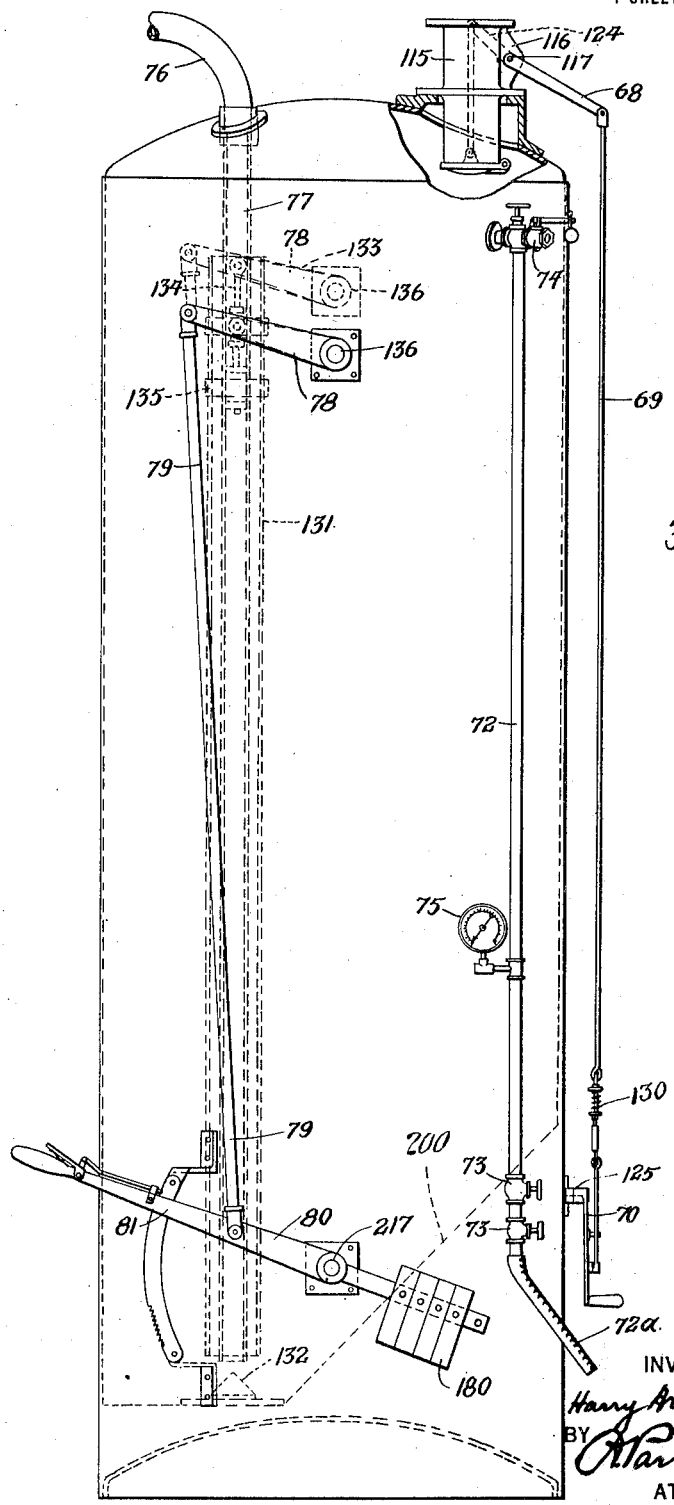

UNITED STATES PATENT OFFICE.

HARRY ARTHUR KIMBER, OF NEW ROCHELLE, NEW YORK, ASSIGNOR TO QUIGLEY FURNACE SPECIALTIES CO., INC., A CORPORATION OF NEW YORK.

BLOWING-TANK FOR COMPRESSED-AIR TRANSPORT SYSTEMS.

1,348,010.     Specification of Letters Patent.     Patented July 27, 1920.

Application filed January 31, 1918. Serial No. 214,755.

*To all whom it may concern:*

Be it known that I, HARRY ARTHUR KIMBER, a citizen of the United States of America, residing at New Rochelle, county of Westchester, State of New York, have invented certain new and useful Improvements in Blowing-Tanks for Compressed-Air Transport Systems, of which the following is a specification.

My invention relates generally to systems for the transportation of fluids under pressure, and more specifically it is designed for use in systems for the transportation of finely pulverized bodies of material, such as powdered coal, through closed conduits and receptacles by the action of compressed air.

This compressed air system of storage and transportation has contributed largely to the practical solution of the problem of the commercial use of pulverized coal which, to be successfully used, must be ground so fine and kept so dry that it is almost impossible to handle it in the open air. It must therefore be kept in closed conduits and passages, and, obviously, any system of mechanical transportation thereof through long conduits to the various points of consumption in even a medium sized plant, would be so cumbersome and costly as to be practically prohibitive. It has been proposed, therefore to transport such pulverized coal by currents of compressed air passing through a system of closed pressure and storage tanks and bins and connecting pipes along which latter the practically fluid mass of almost impalpable coal powder is driven by the air currents. This system involves the use of a central blowing tank located at the milling plant, to which tank the pulverized coal is usually delivered by mechanical conveyers or by gravity, and from which it is blown out in regulated quantities, as required, by the use of compressed air, and driven through connecting pipes to the various furnaces or other points of fuel consumption scattered about the plant. The apparatus heretofore employed for this purpose has, however, developed certain difficulties in operation, such as impossibility of telling what is going on inside this system of necessarily closed conduits, bins and tanks, how much coal has been blown out, and how much retained, etc. My present invention overcomes these and other difficulties and provides a more convenient and efficient apparatus for operating this system. The best form of apparatus at present known to me embodying my invention is illustrated in the accompanying four sheets of drawings in which—

Figure 1 as a front elevation of my improved blowing tank and connections, parts being broken away.

Fig. 2 is a vertical section of a special form of cut-off valve, and

Fig. 3 is a horizontal section taken on line 3—3 of Fig. 2.

Fig. 6 is a side elevation with parts broken away.

Throughout the drawings like reference characters indicate like parts.

Figure 1:
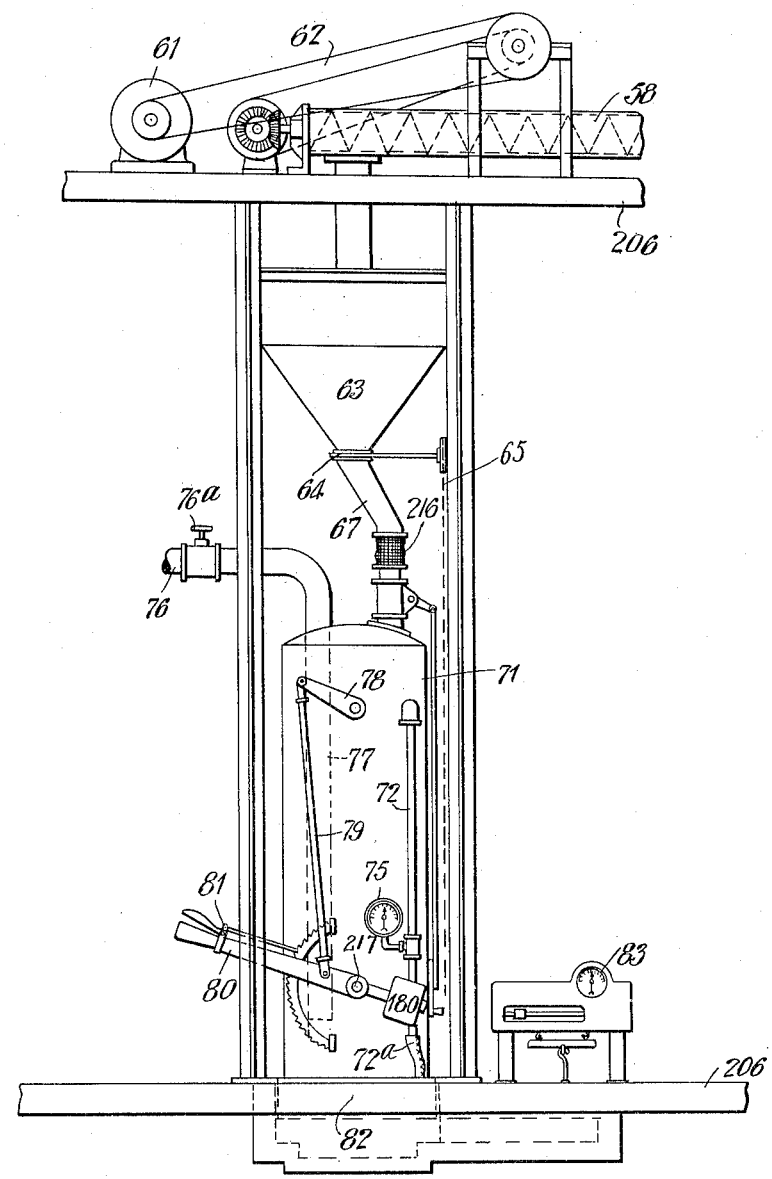

The screw conveyer 58, driven from the motor 61, through the belt and bevel gear drive 62, extends to the milling, drying and separating plant nearby, but not here shown. This conveyer delivers the pulverized coal at its discharge end to the powdered coal bin 63. The outlet from this bin is controlled by gate 64, operated by the usual chain gear 65, and, when said gate is opened, coal falls by gravity through pipe 67, which has a flexible section 216, of canvas or similar material, into the blowing tank 71. This blowing tank is a large, upright, boiler-iron, or steel cylinder, set upon a balanced platform scale 82, provided with the quick reading dial 83. 72, is a pipe for compressed air and 72ª, a flexible section therein. On account of the flexible connection 216, in the pipe 67, and that 72ª, in pipe 72, and the elasticity of the long lever arm of outlet main 76, which has its nearest support about fifteen feet from the blowing tank, the weight of this blowing tank and its contents can at any time be determined by said scale, as the tank has no support other than scale 82.

The inlet to this blowing tank marks the end of the elevator and screw conveyer portion of the transportation system which has conducted the raw coal through the crusher to the drier and from the drier through the pulverizers and separators to the storage bin 63, at the terminus of the milling section. From the blowing tank, onward, a compressed air system of transportation for the pulverized coal is employed. The general plan of operation is as follows: Whenever a demand is received from any one of the different furnaces or other localities of consumption for a given amount of pulverized coal for storage in its local bin, the operator of the blowing tank admits that amount or more into the blowing tank from storage bin 63, shuts off the connection from the storage bin 63, by means of an air tight shut-off valve, hereinafter to be described, turns on compressed air pressure to the blowing tank, and after sufficient air pressure has been built up in the tank 71, opens the discharge valve 76ª, to the main distributing pipe 76. The pressure of the air drives the contents of tank 71, out into the pipe 76, from which it is distributed to the desired locality through the action of apparatus not herein described. When the weight registered on the dial scale is reduced so that the pointer shows that the desired quantity of coal has been discharged from the tank, the compressed air supply is shut off, and, after the proper disposition of the apparatus hereinafter to be described more in detail, the operation can be repeated, to supply the next demand.

Figure 5:
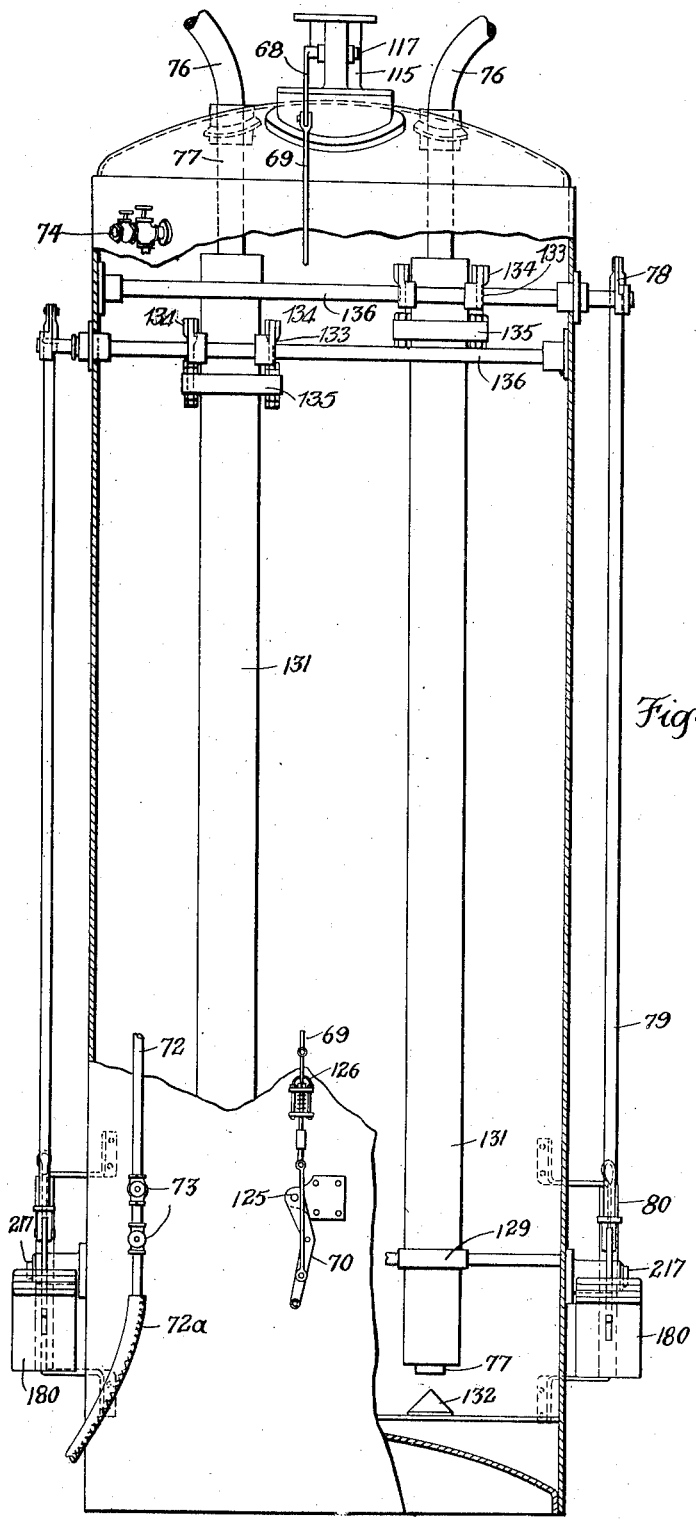
Fig. 5 is a front elevation with parts broken away and others shown in section of the blowing tank.
Figure 4:
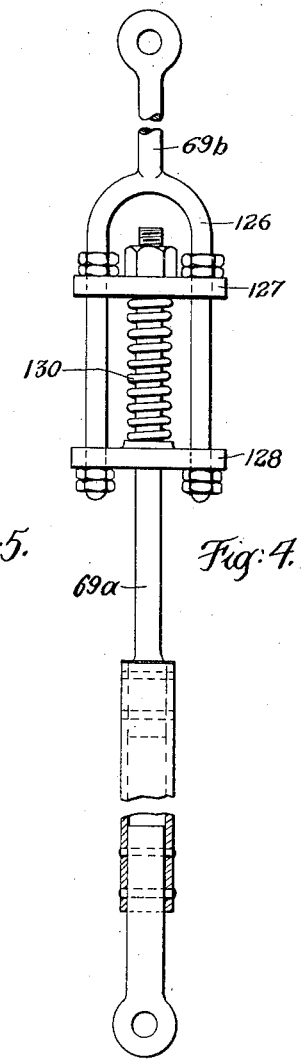
Fig. 4 is an enlarged detail with parts broken away of an adjustable elastic connection for operating the cut-off valve.

The special form of cut-off valve, which must be air tight in order to retain in the blowing tank the compressed air and prevent it blowing back into the storage bin 63, and connections, are shown more in detail in Figs. 2, 3, 4, 5 and 6. It consists of a casting 115, of substantially cylindrical shape located in the upper head of the blowing cylinder and connecting with the flexible section 216, of the pipe 67, and of the hinged bottom, or clack valve 119, hinged at the lower end of casting 115, and of means for operating this clack valve. 120, is a yielding gasket mounted in a groove in the face of the clack valve 119, and registering with the lower end of casting 115, forming a yielding closure face for the valve 119. Vertical motion of the valve in seating itself with such yielding surface is allowed for by means of the special hinged connection consisting of the vertical slot 122, in the lug 121, on the casting 115, in which slot rests the pintle 123, of the valve 119. 124, is a crank arm on shaft 117, journaled in the walls of an extension chamber 116, formed at the upper end of casting 115, and this crank arm is connected by link 118, with valve 119. On the outer end of shaft 117, is lever 68, connected, by link 69, to the lower hand operated lever 70, which, as shown in Fig. 5, is pivoted to the side of the tank at 125, in such manner that it may be carried slightly beyond parallelism with the link 69, so as to automatically lock the parts in the position shown in Fig. 5, which is the position assumed when the cut-off valve is closed. In order to allow for the yielding pressure necessary to hold the valve 119, tight upon its seat, a spring section is inserted in the link 69, shown in enlarged detail in Fig. 4. 126, is a bifurcated yoke sliding in cross head 127, held on the end of the lower section 69ª of link 69, by a nut, as shown, or by other convenient fastening. 128, is a cross piece fastened at the end of the upper link section 69ᵇ, perforated to allow link section 69ª to pass therethrough. 130, is a spiral compression spring mounted on link section 69ª, confined between cross head 127, and cross piece 128.

72, is the compressed air supply pipe connected by flexible connection 72ª, to some source of compressed air, not shown, and controlled by valves 73. 74, is a safety valve and 75, a pressure gage.

The control of the discharge of material from tank 71, into pipe 76, through its extension 77, which passes into the blowing tank and nearly down to the bottom thereof, is effected by means of the vertically movable curtain pipe 131, guided at its lower end on ring 129, and supported from its upper end by crank arms 133, through the medium of links 134, the lower ends of which are pivoted to the flange 135, fast upon the curtain pipe 131. The crank arms 133, are rigid on the horizontal shaft 136, journaled in the sides of the tank and extending therethrough. At the outer end of this shaft is fastened the lever or crank arm 78, so that the whole construction forms a bell crank for supporting curtain pipe 131. To the free end of the arm 78, is pivoted the link 79, the lower end of which is pivoted to the control lever 80, mounted on the side of the tank near the bottom thereof. This lever is pivoted to the tank wall at 217, and has an adjustable counterweight 180, on its rear end and can be locked in any position by the usual quadrant and latch rigging 81, best shown in Fig. 6.

Just below the lower end of the extension 77, of the outlet main 76, and in line with and adapted to fit into the lower end of the curtain pipe 131, is the cone 132, shown in Figs. 5, and 6.

The operation of this apparatus is as follows: The cut-off valve 119, is left open in the lower position shown in dotted lines in Fig. 2, when pulverized coal is to be delivered to the blowing tank from the storage bin above it. This brings the valve lever 68, into the raised position shown in dotted lines in Fig. 2, and of course assumes that the valve operating hand lever 70, is in its elevated position. When it is desired to blow out a quantity of coal, the lever 70, is forced down into the position shown in Fig. 5, automatically locking itself against any upward tension of the link 69. This swings the valve 119, and its connected parts into the closed position shown in full lines in Figs. 2 and 6. The parts are so proportioned that forcing lever 70, into the position shown in Fig. 5, will put the spring section of link 69, under tension (compressing spring 130) and produce a constant powerful upward pull on the valve 119, causing it to make an air tight joint through the action of the elastic gasket 120.

Normally the curtain pipe 131 is lowered so that it surrounds cone 132, and makes an air tight joint therewith, and discharge valve 76$^a$ is closed. Compressed air is now admitted through pipe 72, until the proper pressure of air is built up in tank 71. Valve 76$^a$, is then opened and air will enter the top of curtain pipe 131, and pass down around the outlet extension 77, and up through the same, out along the main 76, clearing said main of any accumulated coal dust or other matter. If now the control lever 80, is raised into a position approximating that shown in Fig. 1, the curtain pipe 131, will be lifted, as shown in Figs. 5 and 6.

The weight of the body of coal above the level of the lower end of pipe 77, tends to force the coal which is around the lower end of the raised curtain pipe 131, to flow down inclined floor section 200, in under said pipe and under and toward the mouth of extension pipe 77. As the coal flows up over cone 132, the rushing current of air coming down curtain pipe 131, around and up and out through pipe 77, entrains a part or all of the mass of coal in and near its path, and carries it into pipe extension 77. If the curtain pipe is raised high enough (to or nearly to the position shown in Fig. 6), the coal may flow in fast enough to stop the mouth of pipe 77. As soon as the mouth of the latter pipe is closed by the body of coal, the partly unbalanced pressure of the compressed air on the surface of the whole body of coal in tank 71, drives it more rapidly into the pipe 77. As all these masses of pulverized coal are partly pervious to air, under the pressures employed, air also passes through the mass into pipe 77, and either sucks or propels the coal therein up and out along the main 76, so that it arrives at its destination in semi-detached masses or slugs, the length of which is usually some five or six times the diameter of pipe 76. Between every two such slugs or masses of coal is a body of practically pure air acting as a propelling force on the coal, apparently in the same way in which it would act to drive a loose piston through the pipe. The rate of such discharge can evidently be controlled by raising or lowering the curtain pipe 131 through lever 80. When the scales show that the desired amount of pulverized coal has been driven out of the blowing tank, the control lever 80, is forced down again, which closes the curtain pipe 131, upon and around the cone 132, and shuts off the flow of coal from the tank. The compressed air again enters the top of curtain pipe 131, passes down it and then up through the outlet pipe extension 77, into the main 76, clearing it of the last particles of pulverized coal. The compressed air can then be shut off by closing valves 73.

In Fig. 5 two outlet pipe extensions 77, are shown so that two transportation mains could be served though but one is shown in Fig. 1. Consequently the curtain pipes and operating mechanisms are also shown duplicated in Fig. 5.

The entire apparatus is supported on the framework 206, of a building not herein shown.

As a result of the above described arrangement of parts it is possible for the operator who knows the weight of the tank 71, or who has brought the scales 82, to a balance with the tank empty, to thereafter accurately determine by readings from dial 83, the exact amount of coal in the tank 71, at any time. Consequently, he can operate the system promptly and intelligently in answer to all demands upon it. As the cut-off valve 119 is absolutely air-tight when closed there is no loss of compressed air and no chance of escaping air blowing back through bin 63, and screw conveyer 58, to dissipate the fine coal dust into the atmosphere.

Furthermore, as this valve has a hinge offset to one side of the tubular casting 115, it swings clear of the path of discharge from said tubular casting when open and permits large volumes of the pulverized coal to pass freely. As the tension means for closing, i. e. the link 118, is connected to the end of lug 119$^a$, projecting some ways inward from the face of valve 119, the latter is easily pulled up into closed position, in spite of its offset hinge.

Having described my invention, I claim:

1. An apparatus for handling and transporting finely pulverized fuel comprising the combination of a closed tank having one inlet for the coal and another for compressed air, a single outlet for both coal and compressed air, means for closing or opening said inlets and outlet and a balancing scales on which the tank rests, said scales being equipped with an adjustable, quick reading dial attachment, whereby after balancing the scales with tank and contents, the weight of any portion of said contents forced out of the tank by the compressed air pressure may be read from said dial.

2. An apparatus such as set forth in claim 1, in which the outlet pipe extends nearly to the bottom of the tank and has its inlet facing downward combined with a cone set on the tank floor opposite the said inlet, and a vertically movable curtain pipe, open at top and bottom, surrounding the outlet pipe and adapted to be forced down around the cone to prevent the outflow of the coal from the tank, while permitting air to pass out downwardly through it and upwardly through the outlet pipe, whereby, when the delivery of coal is thereby stopped air may still flow out to scavenge the outlet piping.

HARRY ARTHUR KIMBER.

Witnesses:
L. E. TURK,
J. F. McCARTHY.